Dec. 15, 1964     J. A. HERBIG ETAL     3,161,602

PROCESS FOR MAKING CAPSULES

Filed Sept. 5, 1961

PROCESS
FLOW CHART
FOR MAKING MINUTE CAPSULES EN MASSE

V = LIQUID VEHICLE

N = NUCLEUS MATERIAL IN SMALL PARTICLE FORM

W = WALL MATERIAL OF WAX WHICH MELTS ON HEATING AND SOLIDIFIES ON COOLING

} MUTUALLY IMMISCIBLE

ESTABLISH AN AGITATED SYSTEM OF
V = AT LEAST 5 TIMES THE COMBINED AMOUNT OF N AND W
$\left.\begin{array}{c}N\\W\end{array}\right\}$ VOLUME RATIO OF $1/10$ TO $10/1$

HEAT TO MELT WAX

AFTER LIQUID-WALLED CAPSULES HAVE FORMED

COOLING THE SYSTEM WITH CONTINUED AGITATION TO SET THE LIQUID WALLS

RECOVER CAPSULES FROM V     OPTIONAL STEP

WHERE N MAY BE LIQUID OR SOLID OR MIXTURES OF SUCH AT ANY STAGE OF PROCESS

INVENTORS
JAMES A. HERBIG &
JOHN F. HANNY

BY

THEIR ATTORNEYS

3,161,602
PROCESS FOR MAKING CAPSULES
James A. Herbig, Dayton, and John Franklin Hanny, West Carrollton, Ohio, assignors to The National Cash Register Company, Dayton, Ohio, a corporation of Maryland
Filed Sept. 5, 1961, Ser. No. 135,736
16 Claims. (Cl. 252—316)

This invention relates to encapsulation and capsules, particularly to capsules having nuclei of oil-immiscible material invested with seamless conforming walls of heat-liquefiable waxy material and manufactured en masse in an oily vehicle.

With particular reference to the drawing, which shows the process flow chart, the wax-like wall material, either unliquefied or pre-liquefied, and nucleus materials are introduced into a hot oily vehicle to form a three-phase system, which is kept agitated, so that the wax, which is liquefied by the heat, is broken up into small entities, which coat the nucleus material particles to form waxy liquid-walled capsules. Thereafter, with continued agitation, the system is cooled to set the walls to a solid condition to complete the capsules, after which they may be recovered and used as desired.

The capsules are useful individually to protect the nucleus material from various environments, to act as a component of a mixture of capsules having different nucleus materials which may be reactive on contact when the capsule walls are broken, to provide pseudo-dry liquids when the nuclei are liquid, to provide taste-masking for drugs, and for many other purposes which will be evident from what is to follow.

The process is carried on in the oily vehicle, which has in it the two capsule components to form the three-phase system, the oily vehicle being a continuous phase and the waxy wall material and the nucleus material being two discontinuous interspersed phases. The waxy material is in a solid state at room temperature, and the oily vehicle is kept warm enough during the coating step to melt the wax and keep it in liquid condition. All during the process, the system is kept agitated until the capsules are complete.

The materials constituting the three phases must be mutually immiscible, and the nucleus material may be liquid, or solid, or mixtures of liquid and solid materials.

It is within the scope of the invention to provide systems wherein more than one kind of nucleus particle material is used, be it a difference in composition or in physical state. One kind may be liquid, and another kind may be solid. Inasmuch as the wax is deposited as a liquid around individual nucleus particles, it makes no difference as to their physical state or as to their chemical composition relative to other nucleus particles.

The only conditions in the selection of materials are that the materials do not react with each other and that the waxy material is a solid at room temperature; deposits on the nucleus material, as most waxy liquid materials do; and melts in the chosen vehicle.

The nucleus material is introduced into the system either as a particulate solid or as a liquid which is reduced by the agitation to the desired drop size, the agitation being controlled in any manner to achieve this end. The nucleus material may be a solid at room temperature and a liquid at the liquefying temperature of the wax.

The dispersed materials should not be crowded into the manufacturing vehicle to a point where agglomeration occurs. It has been found that, preferably, there should be at least five times the amount of liquid vehicle as there is dispersed material, by volume, to afford complete freedom of movement of the dispersed material, and that the ratio of nucleus material to wax is preferably in the range of from 1-to-10 to 10-to-1 by volume, depending on the amount of nucleus particle surface to be covered and the desired wall thickness to be deposited.

Typical oils which are virtually inert and capable of acting as vehicles are the silicone oils, which may be heated without degradation. Typical waxy materials are the sharp-melting-point polyethylenes and alkyl straight-chain and branched derivatives of such, which are solid at room temperature (20 to 25 degrees centigrade), so that the completed capsules are self-supporting. These capsules may range in size from one to one thousand or more microns, depending on the capsule nucleus material selected for use. If solids are used, greater dimensions may be obtained.

In one instance, silicone oil of the type sold at the present time as "DC-710" by Dow-Corning Chemical Corporation, of Midland, Michigan, was used, which oil, referred to later as Compound III, has a viscosity of 475 to 525 centistokes at 77 degrees Fahrenheit. Into 500 grams of this oil was dispersed five grams of polyethylene having a sharp melting point of about 130 degrees centigrade, a density of .92 to .95, and a molecular weight of about 2500, the temperature of the oil being maintained above the melting point of the polyethylene, and the system being kept agitated until the drop size of the melted polyethylene came to the desired dimension. A drop size of 100 microns is typical. Into this system were introduced, at any time during the foregoing operations, particles of ammonium nitrate of a particle size of 250 microns. The liquid polyethylene deposited on the particles to form liquid waxy walled capsules. The agitation was continued while the system was allowed to cool to room temperature to solidify the walls. The foregoing example is preferred as regards the steps of the process and the criteria for the component parts of the system. The materials used are not to be deemed as limiting the preferred embodiment, which consists of process steps and a structural combination of waxy material and nucleus material in general, as will be indicated by a large number of examples in what follows.

If the waxy material melts below 100 degrees centigrade, water may be encapsulated.

The nucleus material may be a suspension of solid particles in a liquid.

The finished capsules may be recovered from the oily vehicle by conventional methods of decantation, filtration, centrifuging, and the like, or they may be used in the vehicle in which they were manufactured.

There follows a list of chemically compatible, mutually immiscible materials which will illustrate broadly the scope of the invention, which is not limited to any particular materials within the classes named, the invention residing in the process of the formation, en masse, of minute capsules, both microscopic and macroscopic, having waxy walls which are seamless and which conform to the contained nucleus material entity whatever its size and shape.

Other waxes than polyethylene may be used, such as Carnauba wax, spermaceti wax, and a great variety of synthetic and natural waxes, preferably with sharp melting points. Microcrystalline wax may be mentioned specifically among the mineral waxes. Mixtures of waxes may be used. Other waxes useful in practicing the invention are beeswax, candellila wax, paraffin wax, montan wax, Japan wax, and the like.

The oily vehicle, of course, must be kept at a temperature above the melting point of the wax or mixture of waxes used.

Among the oily vehicles that have been found most suitable are (I) A fluid silicone compound having the structure

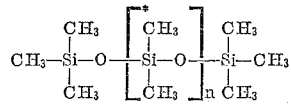

and having a decomposition range of 482 to 572 degrees Fahrenheit.

(II) The compound of I in which 25% of the *CH₃ substituents are replaced by phenyl groups, such compound having a decomposition range of 662 to 752 degrees Fahrenheit.

(III) The compound of I in which 100% of the *CH₃ substituents are replaced by phenyl groups, such compound having a decomposition range of 842 to 932 degrees Fahrenheit.

(IV) Tributyl amine $(C_4H_9)_3N$ in which the hydrogen has been replaced by fluorine having a boiling point of 338 to 356 degrees Fahrenheit, and isomers thereof.

(V) A mixture of perfluoro cyclic ether isomers $(C_8F_{16}O)$ having a boiling point range of 210 to 225 degrees Fahrenheit.

It will be observed that all of these compounds except Compounds I, II, and III are fluorine substituted, and all of them are practically inert to any waxy material or any nucleus material that it is desired to encapsulate. This does not preclude the use of oily vehicles that have some reactivity if used with waxy wall material and nucleus material non-reactive therewith, and the invention is not to be deemed limited to silicone oils or fluorinated oily materials. Mixtures of the oily vehicles may be used as the occasion demands, for special temperature conditions.

Capsules have been formed by the novel method using a number of internal phase materials and associated wall materials listed below in tabular form, together with reference numbers to the oily vehicle in which they were dispersed to form capsule-making systems. As was the case with the vehicles, this list in no way is to be deemed a limitation as to the broad aspects of the invention.

| Nucleus Material | Wall Material | Dispersing Medium |
|---|---|---|
| Magnesium Hydride | Polyethylene | I, II, III |
| Ammonium Nitrate | do | I, II, III, IV |
| Potassium Dichromate | do | I, II, III, IV |
| Ammonium Dichromate | do | I, II, III, IV |
| Aspirin | do | I, II, III, IV |
| d-Propoxyphene·HCl | do | I, II, III, IV |
| Quinidine Gluconate | Paraffin | IV |
| Cadmium Borate | Polyethylene | I, II, III, IV |
| Aspirin | Tristearin | IV |
| Do | Diglyceride | IV |
| Ammonium Dichromate | Tristearin | IV |
| d-Propoxypene·HCl | do | IV |
| Sodium Bicarbonate | Paraffin | IV |
| Do | Tristearin | IV |
| Stannous Fluoride | do | IV |
| Do | Paraffin | IV |
| Do | Polyethylene | IV |
| Bitolylene 4,4-Diisocyanate | Karagami Wax (Japan Wax). | IV |
| Toluene Diisocyanate | Paraffin | IV |
| Do | Polyethylene | IV |
| Diphenylmethane 4,4-diisocyanate. | Paraffin | IV |
| Do | Paraffin—5% Vinyl Resin. | IV |
| Ammonium Nitrate | Polyethylene (Metal particles). | IV |
| Diphenylmethane 4,4-Diisocyanate. | Karagami Wax | IV |
| Do | Cerita Wax | IV |
| Sodium Dichlorocyanurate | Polyethylene | I, II, III |
| Potassium Dichlorocyanurate. | do | I, II, III |
| Chlorinated Trisodium Phosphate. | do | I, II, III |
| Celogen AZ (Blowing Agent) | do | I, II, III, IV |
| Diethylenetriamine | Paraffin/20% Vinyl Resin. | IV |

This list is exemplary only, as was the case with the listing of suitable oily vehicles. The polyethylenes ranged from 2,500 to 12,000 in molecular weight. The Karagami wax is Japan wax processed at the present time by Concord Chemical Company, Incorporated.

The reference in the above lists to metal particles pertains to the introduction of such as powder, to the vehicle, after the liquid waxy walls have been formed. Such material becomes adherent to the walls and is maintained there after the cooling and hardening thereof. Aluminum powder is typical, but any dispersable powder of non-reactive nature can thus be deposited in the capsule walls while they are still in a liquid state. Other examples are colloidal silica, magnetic iron oxide, iron powder, and the like. The powdered materials may act as insulators, electrical or electrostatic materials, chemical powders that are reactant with the capsule contents, etc. The vinyl resin used was a copolymer of ethylene and vinyl acetate.

The order of introduction of the materials into the vessel is not critical. Thus:

(1) The nucleus material may be added to the vehicle already containing the wax;

(2) The wax may be added to the vehicle already containing the nucleus material;

(3) A dispersion of vehicle and wax may be added to a dispersion of vehicle and nucleus material;

(4) A slurry of liquefied wax and nucleus material may be added to the vehicle; or (5) The wax and the nucleus material may have the vehicle added thereto.

If the ingredients are cold when added together, they may later be heated to manufacturing temperature. The mixture of ingredients may be stored cold for later use, provided that the materials are not affected by aging or prolonged contact with each other or the environment. The atmospheric environment may be excluded by canning the mixture for future use.

It is evident that the capsules made by the method disclosed herein may be used as nuclei for the reception of an overcoating of another material of waxy characteristics or of hydrophobic or hydrophilic polymers, such as ethyl cellulose, applied by the method set forth in United States patent application of Thomas C. Powell, Melvin E. Steinle, and Robert A. Yoncoskie, which was filed March 9, 1960, bearing the Serial Number 13,725, or with a hydrophilic polymer in the manner described in United States Patents No. Re. 24,899, issued to Barrett K. Green on November 29, 1960, and No. 2,800,457, issued to Barrett K. Green and Lowell Schleicher on July 23, 1957.

What is claimed is:

1. A process for making minute wax-walled capsules en masse, including the steps of providing a three-phase heated and agitated system consisting of a substantially inert oily vehicle material and finely-divided capsule-forming materials including a waxy capsule wall material and a nucleus material, the waxy capsule wall material being liquid in the heated system but solid at room temperature, and the ratio of nucleus material to waxy material ranging from 1 to 10 to 10 to 1 by volume, and the vehicle, capsule wall, and nucleus materials being mutually immiscible, whereby by said agitation the finely-divided liquid waxy material deposits on each entity of nucleus material to form liquid-walled capsules; and with continued agitation, cooling the system until the liquid waxy walls are solidified to form self-sustaining capsules that may be recovered from the oily vehicle.

2. The process of claim 1 in which the oily vehicle is taken from the class consisting of fluid silicone compounds having the general structure

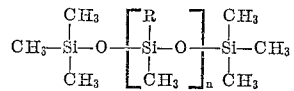

in which (I) R is a $CH_3$ substituent and the decomposition range is 482 to 572 degrees Fahrenheit, (II) R is .75 $CH_3$ substituent and .25 phenyl substituent and the decomposition range is 662 to 752 degrees Fahrenheit and (III) R is a phenyl substituent and the decomposition range is 842 to 932 degrees Fahrenheit; (IV) tributyl amine in which the hydrogen has been replaced by fluorine and the boiling point is 338 to 356 degrees Fahrenheit and isomers thereof, (V) a mixture of perfluoro cyclic ether isomers having a boiling point range of 210 to 225 degrees Fahrenheit, and mixtures thereof.

3. The process of claim 1 in which the nucleus material is a liquid.

4. The process of claim 1 in which the nucleus material is a solid.

5. The process of claim 1 in which the nucleus material is a solid-liquid suspension.

6. A process for making capsules, including the steps of providing a three-phase system, the three phases being mutually immiscible, the said three phases consisting of a major volume of an oily liquid manufacturing vehicle and a minor volume each of entities of capsule nucleus material and heat-liquefiable waxy capsule wall material which is a solid at room temperature but liquefiable in warming at above room temperature, the ratio of vehicle to the nucleus material and the wall material being such that the latter two have full freedom of movement throughout the vehicle; warming and agitating said system to cause the waxy wall material to liquefy and form small entities which deposit and coalesce on each of the nucleus material entities, whereby each of the nucleus entities is provided with a seamless liquid forming waxy material wall; and still with agitation cooling the system to room temperature to cause the liquid walls to set to a solid state to form self-supporting capsules, so that said capsules thus made may be recovered from the manufacturing vehicle.

7. The process of claim 6 in which the nucleus material is a liquid.

8. The process of claim 6 in which the nucleus material is a solid.

9. The process of claim 6 in which the nucleus material is a solid-liquid suspension.

10. The process of claim 6 in which the nucleus material is a solid at room temperature but liquefies as the wall material liquefies during the manufacturing process.

11. A three-phase system of mutually immiscible materials, consisting of a continuous phase of a manufacturing oily vehicle which is a substantially inert material; a discontinuous phase of nucleus material that can be dispersed into minute entities in the manufacturing vehicle by agitation; and a waxy wall-forming material which is a solid at room temperature but meltable at higher temperatures, in which melted condition it too may be dispersed as small entities by agitation to form a second discontinuous phase in the vehicle, and which will coat the nucleus material entities on contact, whereby by heating the system to liquefy the wax, with agitation, to bring about the interspersion and contact of the liquid waxy material entities and the nucleus entities, the latter are individually coated with liquid waxy material entities which coalesce to form a seamless liquid wall that turns to a solid when the system is cooled.

12. The system of claim 11 in which the oily vehicle is a silicone oil.

13. The system of claim 11 in which the oily vehicle is tributyl amine in which the hydrogen is fully replaced by fluorine to form heptacosafluoro-tributyl amine.

14. The system of claim 11 in which the oily vehicle is a mixture of perfluoro cyclic ether isomers having a boiling point range of 100 to 110 degrees centigrade.

15. The process of making capsules including the steps of providing a vessel with 500 grams of the compound (III) designated in claim 2 as a manufacturing vehicle; dispersing in it as wall-forming material, with agitation continued to the end of the process, 50 grams of polyethylene having a sharp melting point of about 130 degrees centrigrade, a density of .92–.95, and a molecular weight of about 2500, the manufacturing vehicle being kept above the melting point of polyethylene, the agitation being adjusted to form a drop-size of 100 microns; introducing into the system at any time up to this point 1 to 10 parts, by weight, of ammonium nitrate on the basis of polyethylene, which continued agitation of the system results in the formation of seamless conforming liquid walls of polyethylene around each particle of ammonium nitrate said ammonium nitrate being introduced in particulate form and the particles having an average dimension of 250 microns; and cooling the system to room temperature to solidify the liquid walls, after which the agitation may be stopped and the now-finished capsules recovered from the vehicle.

16. The process of claim 15 in which droplets of the liquid toluene diisocyanate are used as the nucleus material.

References Cited in the file of this patent
UNITED STATES PATENTS

| | | |
|---|---|---|
| 3,016,308 | Macaulay | Jan. 9, 1962 |
| 3,041,289 | Katchen et al. | June 26, 1962 |
| 3,069,370 | Jensen | Dec. 18, 1962 |

UNITED STATES PATENT OFFICE
CERTIFICATE OF CORRECTION

Patent No. 3,161,602 December 15, 1964

James A. Herbig et al.

It is hereby certified that error appears in the above numbered patent requiring correction and that the said Letters Patent should read as corrected below.

Column 5, line 27, for "forming" read -- conforming --; column 6, line 24, for "centrigrade" read -- centigrade --.

Signed and sealed this 20th day of April 1965.

(SEAL)
Attest:

ERNEST W. SWIDER
Attesting Officer

EDWARD J. BRENNER
Commissioner of Patents